(12) United States Patent
Bell

(10) Patent No.: US 6,949,046 B2
(45) Date of Patent: Sep. 27, 2005

(54) GEAR TO CASE ASSEMBLY FOR DRIVE AXLE

(75) Inventor: Dale K. Bell, Durango, CO (US)

(73) Assignee: ArvinMeritor Technology, LLC, Troy, MI (US)

(*) Notice: Subject to any disclaimer, the term of this patent is extended or adjusted under 35 U.S.C. 154(b) by 0 days.

(21) Appl. No.: 10/688,564

(22) Filed: Oct. 17, 2003

(65) Prior Publication Data

US 2005/0085330 A1    Apr. 21, 2005

(51) Int. Cl.[7] .............................................. F16H 48/06
(52) U.S. Cl. ..................................... 475/220; 475/230
(58) Field of Search ............................... 475/220, 230; 74/606 R

(56) References Cited

U.S. PATENT DOCUMENTS

| | | |
|---|---|---|
| 1,682,871 A | 9/1928 | Short |
| 2,873,622 A | 2/1959 | Nash |
| 3,344,688 A | 10/1967 | Frost |
| 3,853,022 A | 12/1974 | Duer |
| 4,125,026 A | 11/1978 | Torii |
| 4,363,248 A | 12/1982 | Brisabois |
| 4,467,672 A | 8/1984 | Lamy |
| 5,304,103 A | 4/1994 | Schlosser |
| 5,320,587 A | 6/1994 | Bodtker |
| 5,533,423 A | 7/1996 | Stehle |
| 5,697,677 A | 12/1997 | Ruppert |
| 5,791,205 A | 8/1998 | Ruppert |
| 5,806,371 A | 9/1998 | Hibbler |
| 6,196,942 B1 | 3/2001 | Peterson |

*Primary Examiner*—Dirk Wright
(74) *Attorney, Agent, or Firm*—Carlson, Gaskey & Olds

(57) ABSTRACT

A carrier assembly for a drive axle includes a pinion gear and ring gear that is operably coupled to a differential assembly. The differential assembly includes first and second case halves that are attached to each other. Each case half is supported by at least one bearing for rotation relative to a non-rotating axle housing. The ring gear comprises an outer circumference portion, which includes a plurality of ring gear teeth in meshing engagement with said pinion gear, and an inner circumference portion, which is fixed for rotation with the second case half about a differential case axis of rotation. The second differential case half includes a tubular portion that is coaxial with the differential case axis of rotation. The tubular defines a stop surface for the ring gear. The ring gear is constrained between the stop surface and one of the bearings to accommodate thrust loads.

15 Claims, 2 Drawing Sheets

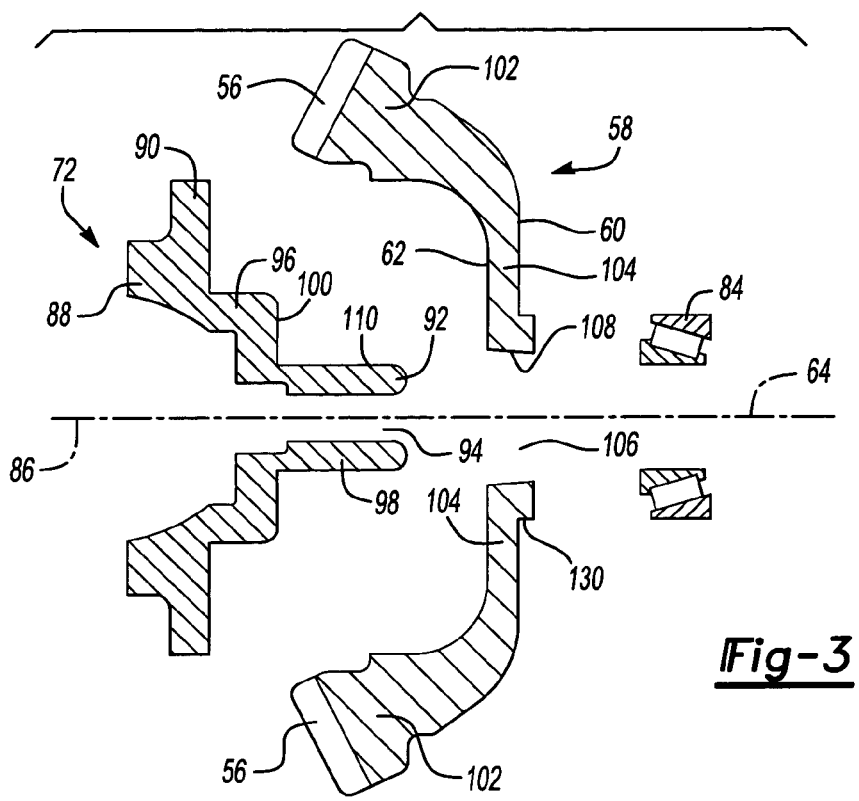
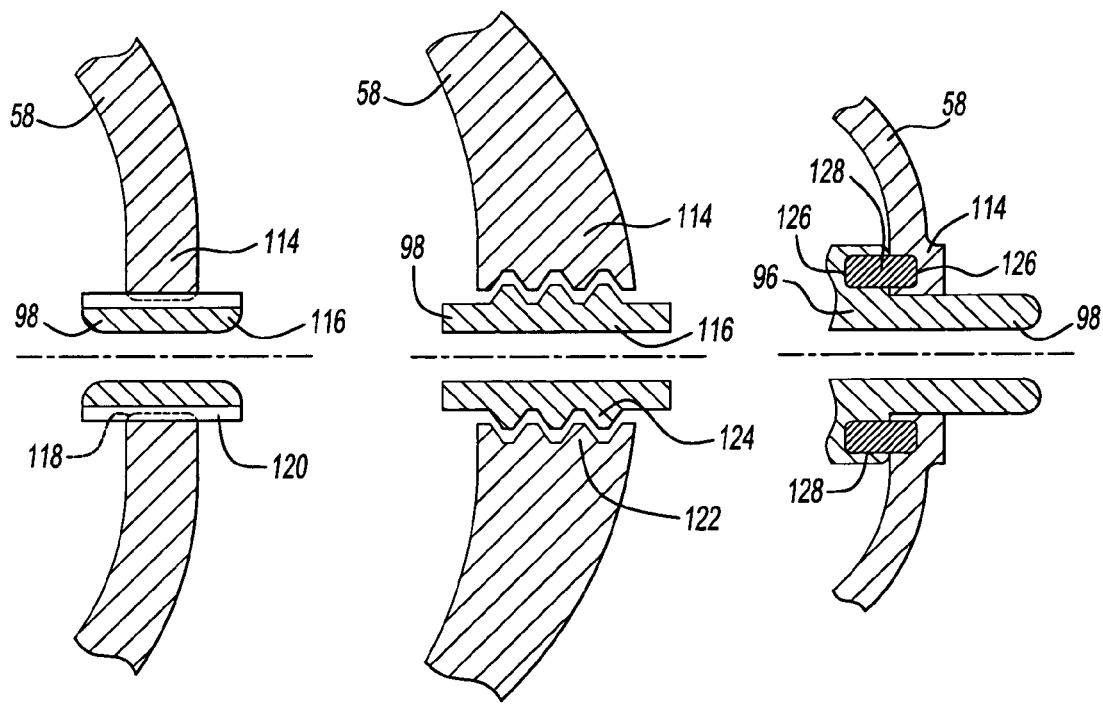

GEAR TO CASE ASSEMBLY FOR DRIVE AXLE

BACKGROUND OF THE INVENTION

This invention relates to a unique gear to differential attachment configuration for a drive axle.

Drive axles include carriers with differential gear assemblies to prevent wheel skid during turning maneuvers. When a vehicle travels along a straight-line path, both sets of wheels on a drive axle will turn at basically the same speed. During a turning maneuver however, the wheels on the outside of the turn must travel a greater distance than the wheels on the inside of the turn, which means that the wheels on the outside of the turn must rotate at a faster speed than the wheels on the inside of the turn. A differential gear assembly is required to allow for this difference in wheel speed.

Traditionally, a drive axle carrier includes a ring and pinion gear assembly that is operably coupled to the differential assembly. The pinion gear is operably coupled to a driving input shaft and is in meshing engagement with the driven ring gear. The differential assembly includes a first differential case half, a second differential case half, and a differential gear set. Traditionally, the ring gear is bolted to one of the case halves to define a first bolted joint, and the first and second case halves are bolted together to define a second bolted joint.

This traditional ring gear and differential case configuration is expensive to manufacture and difficult to assemble. Also, with the increased demand by users to provide more robust designs within the same packaging space, these traditional configurations do not provide room to make critical components more robust within the existing package.

Accordingly, it is desirable to provide a carrier with a differential assembly that includes improved assembly packaging to allow a more robust component configuration for desired components. Further, it is desirable to provide a simplified carrier configuration that reduces the overall number of required components and is less expensive to manufacture, as well as overcoming the other deficiencies in the art outlined above.

SUMMARY OF THE INVENTION

A differential for a drive axle includes a first differential case half and a second differential case half attached to the first differential case half to form a differential case assembly. A bearing assembly supports the differential case assembly for rotation relative to a non-rotating axle housing member about a differential case axis of rotation. Preferably, each of the first and second differential case halves is supported by at least one bearing. A ring gear is fixed for rotation with the differential case assembly and includes an outer circumference portion with a plurality of ring gear teeth and an inner circumference portion defining an opening for receiving a portion of the differential case assembly. The inner circumference portion is constrained between one of the bearings and one of the differential case halves to accommodate thrust loads.

In one disclosed embodiment, the ring gear is mounted to the second differential case half and is constrained from movement in a direction parallel to the differential case axis of rotation by being positioned between the bearing supporting the second differential case half and the second differential case half itself. The ring gear includes a front side on which the ring gear teeth are formed and a back side that faces away from the ring gear teeth. The front side of the inner circumference portion engages the second differential case half and the back side of the inner circumference portion engages the bearing.

In one disclosed embodiment, the second differential case half includes a central body portion and a tubular end portion extending outwardly in a lateral direction from the central body portion. The tubular end is coaxial with the differential case axis of rotation. The tubular end portion includes a first tubular portion defining a first diameter and a second tubular portion defining a second diameter greater than the first diameter. A transitional stop surface transitions from the first tubular portion to the second tubular portion. The transitional stop surface forms a stop for the ring gear. The ring gear directly engages the stop on one side and directly engages the bearing on an opposite side. The ring gear thus reacts between the stop and bearing to accommodate the thrust loads.

The ring gear also is capable of carrying torque. Preferably, the ring gear is fixed for rotation with one of the differential case halves. The inner circumference portion defines a first attachment interface and the tubular end portion defines a second attachment interface. The first and second attachment interfaces cooperating with each other to fix the ring gear for rotation with the differential case half. The attachment interface can include splines, keys, serrations, dowels, etc.

The subject invention provides an improved carrier with differential assembly that significantly reduces the number of required components, improves and simplifies assembly, as well as providing a more robust design within a traditionally sized packaging envelope. These and other features of the present invention can be best understood from the following specifications and drawings, the following of which is a brief description.

BRIEF DESCRIPTION OF THE DRAWINGS

FIG. 3 is an exploded view of the differential housing half, ring gear, and bearing incorporating the subject invention.

FIG. 4 is a cross-sectional view, partially broken away, of one embodiment for attaching the ring gear to the differential housing half.

FIG. 5 is a cross-sectional view, partially broken away, of one embodiment for attaching the ring gear to the differential housing half.

FIG. 6 is a cross-sectional view, partially broken away, of one embodiment for attaching the ring gear to the differential housing half.

DETAILED DESCRIPTION OF A PREFERRED EMBODIMENT

Figure 1:
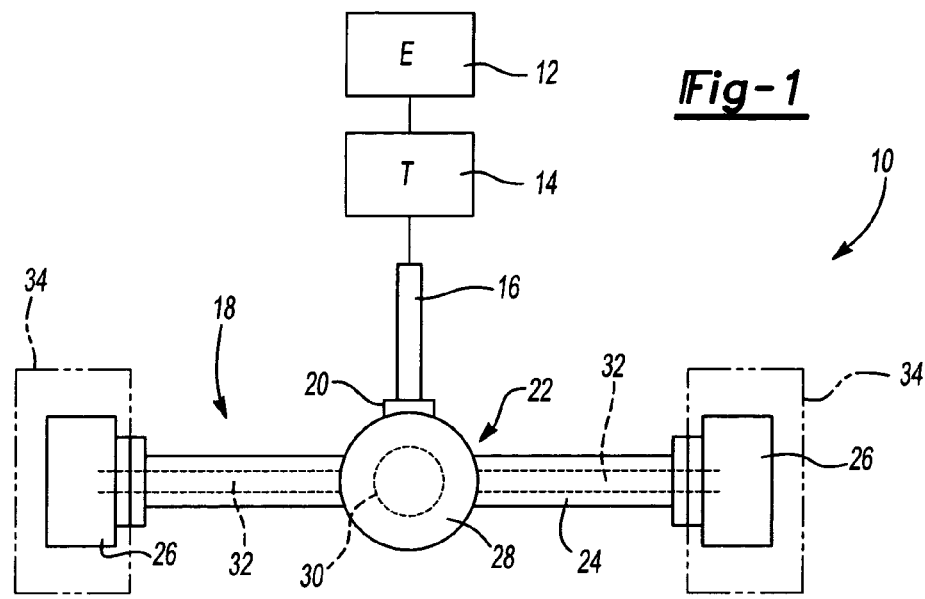
FIG. 1 is a schematic diagram of a drive axle assembly.

A powertrain assembly is shown generally at 10 in FIG. 1. The powertrain assembly 10 includes an engine 12 and transmission 14 that drive a driveshaft 16, as is known in the art. The driveshaft 16 is coupled to a drive axle 18 at an input 20. The drive axle 18 includes a carrier 22, axle housing 24, and a pair of laterally spaced wheel ends 26 positioned on opposing ends of the axle housing 24.

The carrier 22 includes a carrier housing portion 28 and differential assembly 30 that is operably coupled to drive a pair of axle shafts 32. The carrier housing portion 28 is attached to the axle housing 24 to enclose the differential assembly 30 within the drive axle 18. The differential assembly 30 is operably coupled to axle shafts 32, which drive the wheel ends 26. Tires 34 are mounted to the wheel ends 26, as is known in the art.

Figure 2:
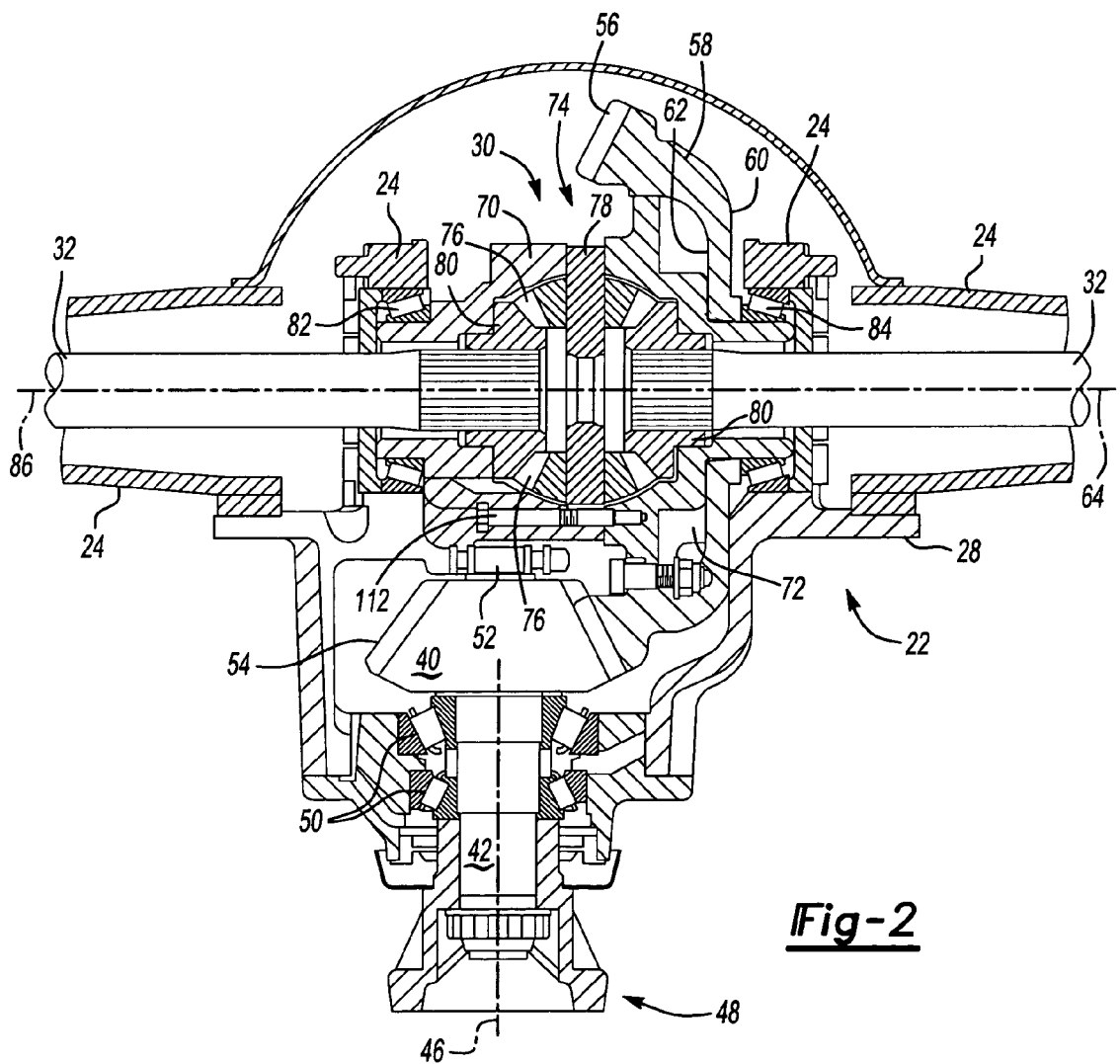
FIG. 2 is a cross-sectional view of a carrier and differential assembly incorporating the subject invention.

The carrier 22 and differential assembly 30 are shown in greater detail in FIG. 2. The carrier 22 includes an input pinion gear 40 supported on a pinion shaft 42 for rotation relative to the non-rotating axle housing 24 about a pinion axis of rotation 46. The pinion shaft 42 is coupled to the driveshaft 16 with a traditional yoke assembly 48. The pinion shaft 42 is supported by a pair of tapered roller bearings 50 positioned on one side of the pinion gear 40 and by a spigot or straight bearing 52 positioned on an opposite side of the pinion gear 40.

The pinion gear 40 includes a plurality of pinion teeth 54 that are in meshing engagement with a plurality of ring gear teeth 56 formed on a ring gear 58. The ring gear 58 has a back side 60 and a front side 62 on which the teeth 56 are formed. The pinion gear 40 drives the ring gear 58 about a ring gear axis of rotation 64 that is transverse to the pinion gear axis of rotation 46.

The differential assembly 30 preferably includes a first differential case half 70, a second differential case half 72, and a differential gear assembly 74. The first 70 and second 72 differential case halves support the differential gear assembly 74. The differential gear assembly 74 preferably includes four (4) differential pinion gears 76 (only two are shown), supported on a four-legged differential spider 78 (only two of the legs are shown). The differential pinion gears 76 intermesh with a pair of side gears 80 that are splined to the axle shafts 32. The differential gear assembly 30 provides wheel speed differentiation during turning maneuvers by allowing the axle shafts 32 to rotate at different speeds from each other.

A first tapered roller bearing 82 supports the first differential case half 70 for rotation relative to the axle housing 24 and a second tapered roller bearing 84 supports the second differential case half 72 for rotation relative to the axle housing 24. The bearings 82, 84 engage the respective case hales 70, 72 on their respective inner diameters. Together, the first 70 and second 72 differential case halves rotate about a differential case axis of rotation 86 that is coaxial with the ring gear axis of rotation 64. The ring gear 58 is constrained between the second differential case half 72 and the second tapered roller bearing 84 to accommodate thrust loads.

As shown in FIG. 3, the second differential case half 72 has a central body portion 88 with a radially extending flange 90 and a tubular end portion 92. The tubular end portion 92 is coaxial with the differential case axis of rotation 86 and includes a hollow opening 94 that receives one of the axle shafts 32. The tubular end portion 92 comprises a first tubular portion 96 defining a first diameter, and which transitions into a second tubular portion 98 that defines a second diameter that is less than the first diameter.

A differential case surface 100 transitions from the first tubular portion 96 to the second tubular portion 98. Preferably the differential case surface 100 is generally perpendicular to the differential case axis of rotation 86. This differential case surface 100 forms a stop for the ring gear 58.

As discussed above, the ring gear 58 includes a back side 60 and an opposing front side 62 on which the teeth 56 are formed. The ring gear 58 also includes an outer circumference portion 102 and an inner circumference portion 104. The outer circumference portion 102 includes the ring gear teeth 56 and the inner circumference portion 104 includes an opening 106 for receiving the second tubular portion 98. The opening 106 defines a bore surface 108 that directly engages an external surface 110 of the second tubular portion 98.

The front side 62 of the inner circumference portion 104 interfaces with the differential case surface 100 and the back side 60 of the inner circumference portion 104 engages the bearing 84. Preferably, there is direct engagement or interface between the front side 62 of the inner circumference portion 104 and the differential case surface 100 and direct engagement between the back side 60 of the inner circumference portion 104 and the bearing 84. Optionally, the bearing 84 could engage the ring gear 58 on surface 130, which would allow the length of the differential case half 72 to be shortened.

Either configuration securely holds the ring gear 58 in place and constrains the ring gear 58 from moving laterally in a direction parallel to the differential case axis of rotation 86 to accommodate thrust loads. Depending on the size of the differential housing half 72, ring gear 58, and bearing 84, and depending on the type of vehicle application, the pinching or holding of the ring gear 58 between the differential case half 72 and bearing 84 provides a sufficient attachment interface. In other words, the ring gear 58 does not have to be additionally bolted to the differential case half 72.

However, if necessary, the ring gear 58 can be bolted or welded to the differential case half 72 to achieve a more secure attachment. Further, the differential case halves 70, 72 can be bolted to each other with a plurality of fasteners 112 (only one is schematically shown with dashed lines in FIG. 2), or can be attached to each other without fasteners by a welding process. If the case halves 70, 72 are welded together, then each case half 70, 72 should preferably be made from forged or cast steel. If welding is not used, the case halves 70, 72 can be formed from iron, which is cheaper and lighter than steel.

In order for the ring gear 58 to carry torque to the differential assembly 30, the ring gear 58 should be fixed for rotation with the second differential case half 72. The ring gear 58 includes a first attachment interface 114 and the second differential case half 72 includes a second attachment interface 116. The first 114 and second 116 attachment interfaces cooperate with each other to fix the ring gear 58 for rotation with the differential assembly 30.

The first attachment interface 114 can comprise a first set of splines 118, as shown in FIG. 4. A corresponding set of splines 120 is formed on the second attachment interface 116 for engagement with the first set of splines 118. The splines 120 can be formed on either the first 96 or second 98 tubular portions, however, formation of the splines 120 on the second tubular portion 98 is preferred.

Optionally, the first attachment interface 114 can comprise a first set of serrations or teeth 122, as shown in FIG. 5. A corresponding set of serrations or teeth 124 is formed on the second attachment interface 116 for engagement with the first set of teeth 122. This could be accomplished with a threaded or shrink fit attachment. Preferably, the serrations 124 are formed on the ring gear and then are pressed into the case half, cutting the mating serrations 122 in the softer case material during assembly.

Optionally, the first 114 and second 116 attachment interfaces can comprise openings 126 for receiving a plurality of keys, dowels, or other similar components 128, as shown in FIG. 6. The dowels or keys 128 align and lock the ring gear 58 to the second differential case half 72.

The subject invention provides an improved carrier with a differential assembly that allows for a more robust component configuration within a traditional package and provides the capability of packaging faster axle ratios in a smaller envelope. Although a preferred embodiment of this invention has been disclosed, a worker of ordinary skill in this art would recognize that certain modifications would come within the scope of this invention. For that reason, the following claims should be studied to determine the true scope and content of this invention.

I claim:

1. A differential for a drive axle comprising:
   a first differential case half;
   a second differential case half attached to said first differential case half to form a differential case assembly;
   at least one bearing supporting said differential case assembly for rotation relative to a non-rotating axle housing member about a differential case axis of rotation; and
   a ring gear fixed for rotation with said differential case assembly and including an outer circumference portion having a plurality of ring gear teeth and an inner circumference portion defining an opening for receiving a tubular portion of said differential case assembly wherein said inner circumference portion is constrained between said at least one bearing and said differential case assembly to accommodate thrust loads.

2. The differential as set forth in claim 1 wherein said tubular portion is coaxial with said differential case axis of rotation.

3. The differential as set forth in claim 2 wherein said ring gear is constrained from movement in a direction parallel to said differential case axis of rotation between said at least one bearing and said differential case assembly.

4. The differential as set forth in claim 3 wherein said tubular portion comprises a first tubular portion formed on one of said first and second differential case halves, said one of said first and second differential case halves including a second tubular portion having a greater diameter than said first tubular portion and a transitional surface extending between said first and second tubular portions with said ring gear being positioned between said transitional surface and said at least one bearing.

5. The differential as set forth in claim 4 wherein said ring gear includes a first side on which said plurality of ring gear teeth are formed and a second side facing opposite from said plurality of ring gear teeth, said inner circumference portion including a first surface on said first side and a second surface on said second side wherein said first surface directly engages said transitional surface and said second surface directly engages said at least one bearing.

6. The differential as set forth in claim 2 wherein said inner circumference portion is directly attached to said tubular portion.

7. A carrier assembly for a drive axle comprising:
   a pinion gear operably coupled to an input shaft defining a pinion gear axis of rotation;
   a ring gear driven by said pinion gear about a ring gear axis of rotation positioned transversely to said pinion gear axis of rotation, said ring gear having a back side and an opposing front side with a plurality of ring gear teeth;
   a differential case including a first differential case half and a second differential case half attached to said first differential case half wherein said ring gear is mounted to said second differential case half; and
   at least one bearing supporting said second differential case half for rotation relative to a non-rotating axle housing member about a differential case axis of rotation coaxial with said ring gear axis of rotation wherein said ring gear is constrained from movement in a direction parallel to said differential case axis of rotation between said at least one bearing and said second differential case half to accommodate thrust loads.

8. The assembly as set forth in claim 7 wherein said ring gear comprises an outer circumference portion including said plurality of ring gear teeth and an inner circumference portion defining an opening surrounding a portion of said differential case, said inner circumference portion being constrained between said at least one bearing and said second differential case half.

9. The assembly as set forth in claim 8 wherein said second differential case half includes a central body portion with a flange extending out radially around said central body portion and a tubular end portion extending outwardly in a lateral direction from said central body portion, said tubular end portion being coaxial with said differential case axis of rotation.

10. The assembly as set forth in claim 9 wherein said tubular end portion includes a first tubular portion defining a first diameter, a second tubular portion defining a second diameter greater than said first diameter, and a transitional surface extending between said first and second tubular portions to form a stop for said ring gear.

11. The assembly as set forth in claim 10 wherein said stop is generally perpendicular to said differential case axis of rotation.

12. The assembly as set forth in claim 11 wherein said front side of said inner circumference portion directly engages said stop and said back side of said inner circumference portion directly engages said at least one bearing.

13. The assembly as set forth in claim 9 wherein said inner circumference portion defines a first attachment interface and wherein said tubular end portion defines a second attachment interface, said first and second attachment interfaces cooperating with each other to fix said ring gear for rotation with said second differential case half.

14. The assembly as set forth in claim 8 wherein said ring gear is fixed for rotation with said second differential case half about said differential case axis of rotation and is constrained from movement in a direction parallel to said differential case axis of rotation without the use of fasteners.

15. The assembly as set forth in claim 8 wherein said first and second differential case halves are comprised of iron.

\* \* \* \* \*